United States Patent Office 3,521,349
Patented July 21, 1970

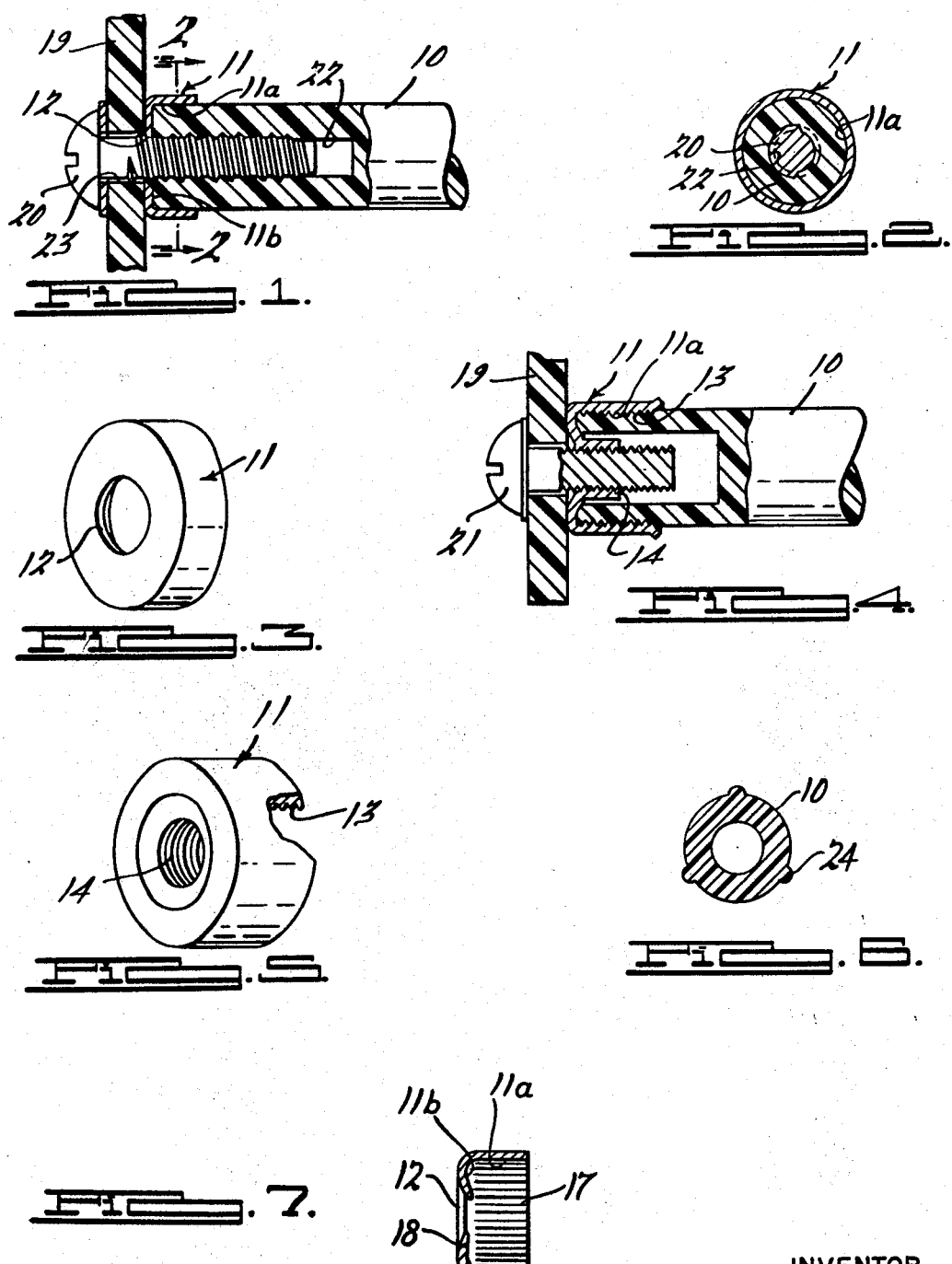

3,521,349
METHOD OF JOINING FIRST AND SECOND MEMBERS
James H. Gehring, 4080 N. Sagamore Drive, Fairview Park, Ohio 44126
Application Feb. 27, 1967, Ser. No. 618,974, now Patent No. 3,385,617, dated May 28, 1968, which is a continuation-in-part of applications Ser. No. 446,846, Apr. 8, 1965, and Ser. No. 538,090, Mar. 28, 1966. Divided and this application May 27, 1968, Ser. No. 732,381
The portion of the term of the patent subsequent to May 28, 1985, has been disclaimed
Int. Cl. B23p 19/00
U.S. Cl. 29—526                                        6 Claims

ABSTRACT OF THE DISCLOSURE

Method for joining two rigid load supporting members by providing one of the members with a generally annular protruding boss with a bore therein, placing a metal cap over the boss and then securing the other member to the boss by means of a threaded fastener threadedly received through the bottom of the cap and extending into the bore in the boss, and in the preferred embodiment, also threadedly engaged with walls of the bore in the boss.

DESCRIPTION OF THE INVENTION

This application is a divisional application of application Ser. No. 618,974, now Pat. No. 3,385,617, issued May 28, 1968, which is a continuation-in-part of application Ser. No. 538,090, filed Mar. 28, 1966, now abandoned and a continuation-in-part of application Ser. No. 446,486, filed Apr. 8, 1965, now abandoned.

This invention relates to a method for securely fastening or joining two rigid load supporting members. More specifically, this invention relates to a noted method for securing or joining plastic molded parts, or securing other parts to plastic molded members.

When endeavoring to join two or more molded plastic parts, the prior art resorted to numerous types of metal inserts. These inserts are inserted, one way or another, into recesses in the parts to be joined. Screws or other types of fastening devices are then threaded into the insert. None of these techniques or none of the numerous types of inserts have met with much success for a number of reasons. The prior art inserts are of two basic types, namely, the molded-in type and the press-in and expansion type. The disadvantages of the molded-in type are that: there is a tendency to create "sink" marks; molding machine cycling time is greatly increased because normal cycling is delayed while inserts are placed on alignment pins; molding machine "down" time increases because of inserts floating off the pins; frequent jamming of the machines with inserts left in salvaged plastic; inaccurate positioning of inserts as to either hole location or angularity causes many rejects; internal threads are often damaged by the entrance of plastic during molding; and the homogeneousness of the molded part is affected when the hot melt contacts the cold insert.

The disadvantages of the press-in and expansion type are as follows: they will pull out or turn out at relatively low loads because the push-in press fit and expansion has minimal depth of purchase in parent plastic material; there is a high degree of radial stress and cracking of the bosses during installation, some designs depend upon the installation of the screw for expansion and therefore when the screw is removed for disassembly or assembly, there is a high incidence of inserts falling out of the holes; the insert's spline sometimes shears the threads of the screw; there is a critical hole size tolerance for all of these inserts; and the design which is expanded by an integral internal spreader plate limits the length of the screw which can be used.

A problem which prevails among all the prior art inserts as well as the use of a screw directly threaded into the plastic part, is that the plastic material cold flows over a period of time which the result that it actually flows out of the roots of the threads. Accordingly, the degree of engagement of the threaded fastener with the part, whether it be the insert or a screw itself, is reduced with time and therefore the tensile load which the connection will support is also reduced with time.

A principal object of this invention is to overcome the aforementioned disadvantages of the prior art practices.

More specifically, an object of this invention is to provide a method for securely joining plastic parts which will prevent damage and fracture thereto.

Another object of this invention is to provide a method of joining plastic members without damage thereto and which will allow the parts to be disassembled and securely reassembled a great number of times.

Another object of this invention is to provide a method for joining the plastic parts which will eliminate "sink" marks in the molded plastic by allowing the walls of the boss to be thinner than is possible with prior art practices.

A still further object of this invention is to provide a method for joining molded plastic parts which will permit broader tolerances in the molding process than is permissible with other techniques.

Another object of this invention is to provide a method for joining rigid plastic parts which will reduce to a minimum the scrap which has prevailed with other techniques.

A still further object of this invention is to provide a method of joining plastic parts which eliminates the problem of misalignment and misthreading of the screw with respect to the part.

A still further object of this invention is to provide a method for joining molded plastic parts wherein the cold flow of the plastic which occurs with age actually enhances the strength of the connection, in contrast with the prior art processes wherein age decreased the strength of the connection.

A further object of this invention is to provide a method for joining molded plastic parts which is suitable for all types of plastics, regardless of the hardness and other characteristics.

A still further object of this invention is to provide a method for joining molded plastic parts in a way which will withstand severe vibrations for extended periods of time without weakening.

Referring now to the drawings.

FIG. 1 is an elevational view, partly in section, illustrating one preferred embodiment of the invention.

FIG. 2 is a cross sectional view taken along line 2—2 of FIG. 1.

FIG. 3 is a perspective view of a metal fastener utilized in this invention.

FIG. 4 is an elevational view, partly in section, illustrating an alternative embodiment of the metal fastener including means adapted to enhance the connection between the fastener and the part as well as between the threaded screw member and the fastener.

FIG. 5 is a perspective view of the metal fastener of FIG. 4.

FIG. 6 is a cross sectional view of a boss which includes circumferentially spaced ribs extending longitudinally thereof for the purpose of enhancing the engagement between the metal fastener and the boss.

FIG. 7 is a sectional view of a preferred embodiment of the invention wherein the inner walls of the cap are provided with serrations and the opening in the bottom thereof is provided with a thread form or stamped nut impression.

Referring now more particularly to the drawings, wherein like reference numerals refer to like parts, reference numeral 10 generally indicates a protruding boss extending from one resinous rigid load supporting member which is to be secured to another rigid load supporting member generally indicated at 19. The cup-shaped metal fastener utilized in this invention is generally indicated throughout the various views by reference numeral 11. The fastener itself, which is preferably circular but may be of any cross section, includes inner side walls 11a and an end wall 11b. Centrally in the end wall 11b is provided a fastener receiving aperture or opening 12 adapted to receive a fastener such as threaded fastener 20. In the embodiment illustrated in FIG. 1 the inside diameter of the cup-shaped metal fastener 11 is just slightly smaller than the outside diameter of the boss 10 so that when the cap is pushed on, preferably manually, there will be a gripping or frictional engagement between the inner side walls 11a of the fastener and the outer periphery of the boss 10.

The actual difference in dimensions between the outside diameter of the boss and inside diameter of the fastener will be dictated by many factors including the material from which member 10 is constructed, the material from which the fastener is constructed, the type of threaded fastener 20 to be used, and the dimensional relationship between the diameter of the opening 12 and the diameter of the screw 20 to be discussed more fully hereinafter. It is essential, however, that the aforementioned dimensional relationships be so selected that the hoop stress in the side walls 11a of the cap be greater than the torque transmited to the cap 11 as the fastener is being threaded into the parts thereby to prevent rotation of the cap 11 with respect to the boss member 10. In this latter regard, the inner side walls 11a of the cap 11 may be provided with radially inwardly directed projections or protuberances to provide a mechanical interlock with the boss member 10 to further enhance the resistance of the cap to rotation.

A very significant feature of this invention is attributed to the structural or dimensional relationship between the crest diameter of the threaded member 20 and the diameter of the opening 12 therein. In this regard it should be noted that the crest diameter of the screw 20 must always be greater than the diameter of opening 12.

It will be understood that with opening 12 being generally circular, and not being formed to accommodate the helix of the screw 20 which has a crest diameter larger than the opening, a very small amount of the metal defining the opening 12 will be forced inwardly into the boss by the leading face of the thread. Further, when the screw is axially loaded, the face of the threads being in engagement with the end wall 11b of the cap, adjacent the opening 12, the walls 11a are caused to collapse slightly. This in turn, causes the side walls of the cap or cup-type fastener to hug or grippingly engage the outer surface of the boss 10 to a greater extent thereby providing a true locking action. In this regard, it will be noted that engaging the opening 12 and applying an outwardly directed axial load will cause the side walls 11a to contact slightly in a sort of "Chinese Finger" fashion.

The spectific relationship between the crest diameter of the threaded member 20 and the inside diameter of the bore 22 in the boss 10 depends primarily upon the type of material from which the boss is constructed. More specifically, if the boss 10 is made of a brittle plastic, such as Bakelite, which is very brittle, the crest diameter should be only slightly larger than the inside diameter of the bore. The reason for this is that such a brittle plastic flows only slightly when contacted by the screws, and accordingly, the applied stresses are transmitted throughout the adjacent regions of the part. It is clear that this will cause cracking of the part if the stresses are too great. However, on such materials as polyethylene, polypropylene, etc. which are comparatively soft and therefore will flow to a considerable extent, it is preferred to provide a maximum area of engagement of the threaded member with the walls 22 and therefore the crest diameter of the threaded member should be somewhat greater. As a specific example, if a 6–32 screw were to be used, which has a major diameter of 0.138 inch and a minor diameter of 0.097 inch, the diameter of the bore in the boss would be 0.112 inch for a soft plastic, 0.116 inch for a medium plastic and 0.120 inch for a relatively hard plastic. Another actual working example involving a 10–24 screw which has a major diameter of 0.190 inch and a minor diameter of 0.136 inch, a bore diameter of 0.158 inch, 0.161 inch, 0.168 inch, has been found suitable for a relatively, soft, medium and relatively hard plastic, respectively.

Further, the particular type of thread form is also principally dependent of the type of plastic used. In this regard it will be understood that when using a relatively brittle material, such as Bakelite, which does not flow, the material must be removed, at least in part, or the boss will be unduly and unnecessarily stressed and may even crack. Accordingly, for such a brittle material it is preferred to use a thread cutting screw such as is well known in the art and actually removes a small amount of material which falls to the bottom of the hole as the screw enters. On the other hand, when a relatively soft material is being used, a thread forming screw is preferred since it permits an uninterrupted grain flow of the material, and therefore a stronger thread, as well as providing a larger area of thread contact with the material of the bore to assure greater resistance to vibration.

While it is not necessary in many cases, it is preferred to select the dimensions of the parts so that the screw engages the bore in the boss. It has been found for example, that engaging the wall of the bore with the screw produces a connection which is considerably more resistant to vibrations than a joint wherein the threaded fastener remains free of the bore. With particular reference to FIG. 1 it will also be noted that as the screw enters the bore, it tends to expand the outer wall of the boss 10 to increase the frictional engagement of the boss with the walls 11a of the cap thereby increasing the resistance of the cap to rotation. That portion of the boss 10 which occupies the space between the screw 20 and the inside walls 11a of the cap is effectively in compression, and if the screw engages the wall of the bore 22, the amount of compression is increased.

While it is essential that the major or crest diameter of the threaded fastener be greater than the diameter of the bore 12, the minor or root diameter may be less than, the same as or slightly greater than the diameter of the bore 12. However, if the root diameter is greater than the diameter of the bore 12, it is necessary to use a self-tapping screw such as a thread cutting screw.

Referring now to FIG. 4, there is illustrated an alternative embodiment of the invention wherein the inner walls 11a of the cup-shaped fastener are threaded as at 13. Whether the threads 13 are of the thread forming or thread cutting type would be determined by the conditions aforementioned regarding the embodiment wherein the screw threads of the threaded fastener engages the walls with bore 22. Further, if preferred, the boss can be threaded prior to the threading on of the cap fastener 11. FIG. 4 also shows a further alternative feature of the cap fastener wherein the fastener receiving opening is provided with threaded walls 14.

FIG. 7 shows another preferred embodiment of the invention wherein the inner walls 11a are provided with serrations 17 for the purpose of effecting a mechanical interlock between the cap and the outer walls of the boss 10 to improve the resistance of the part to rotation. It is apparent from the foregoing that numerous techniques, such as an interference fit, threads, serrations, or other radially inwardly directed projections or protuberances may be utilized to prohibit rotation or other dislocation of the fastener. It will also be noted that the embodiment shown in FIG. 7 includes a stamped nut impression or thread form 18 in the opening 12. The diameter of the opening 18 may be selected so that it is slightly smaller or substantially the same as the root diameter of a machine screw, thread forming or cutting screw, or it may be slightly smaller than the root diameter of a thread forming or thread cutting screw.

It is significant to note that if the root diameter of the threaded fastener received into the opening 18 is larger than the dimension of the opening 18, that the opening is caused to expand slightly which causes a small contraction of the walls 11a thereby further enhancing the gripping engagement thereagainst.

The serrations shown in the embodiment of FIG. 7 may be used with the type of cap shown in FIG. 1 which does not include a stamped nut impression or thread form, or vice versa. It will be recognized that when a stamped thread form, such as shown in FIG. 7, is used, the threads of the screw causes the opening 18 to be drawn axially outwardly of the cap as the screw bottoms. Stated differently, as the under side of the screw head meets resistance, member 19 for example, the axially inwardly directed sides of opening 18 will be drawn outwardly upon further rotation of the screw. The result of this movement of opening 18 is a still further tightening of the walls 11a upon the boss. Axial loading of the screw from any other source will yield similar results.

When the stamped nut impression or thread form is used, it is preferred to countersink the boss slightly to accommodate the inwardly protruding walls of opening 18.

FIG. 6 shows a boss which has been provided with a plurality, preferably at least 3, radially outwardly protruding ribs 24 which extend therealong. The ribs 24 are dimensioned to be just slightly greater than the inside wall diameter of the cup or cap type member so that when the cap is pushed onto the boss, the ribs 24 are partially sheared off. This type of boss design is found to be particularly effective with the serrated type of cap as shown in FIG. 7.

The threaded fastener illustrated and described is a slotted screw of known types. It will be understood, however, that other types of threaded fasteners may be used so long as the threads thereon are capable of transmitting an axial load to the boss. It is inherent in applicant's invention that the screw supports and transmits axial loads.

While I have described and illustrated certain embodiments of my invention in some particularity, obviously many other embodiments, variations, and modifications thereof will readily occur to those skilled in this art, and I do not therefore limit myself to the precise detail as shown and described herein, I claim as my invention all embodiments, modifications and variations coming within the scope of the appended claims.

I claim:

1. A method of joining a first rigid structural member made of plastic, a second rigid structural member, and a threaded fastener, wherein both of the structural members are capable of transmitting tension, compression and vibration, comprising the steps of:

providing a boss which protrudes outwardly from the surface of the first member;

providing and unthreaded bore in the said boss;

placing and securing a cup-shaped cap having a side wall and an end wall, with an opening in the end wall thereof, over said boss in interference relationship therewith and generally aligning the opening in the end wall of the cap with the bore in the boss;

providing the depth of the cap, the effective outside diameter of the boss, and the effective inside diameter of the cap with dimensions so that the cap grippingly engages the boss sufficiently to prevent the cap from rotating as a threaded member is being received therethrough and into the bore in the boss;

placing a threaded member, having a helical thread of a standard type with a crest diameter greater than the diameter of the bore in the boss and a radially protruding shoulder, through the second structural member and through the opening in the cap, and rotating the threaded member into threaded engagement with the last said opening;

continuing the rotation of the threaded member until it is in threaded engagement with the bore in the boss, thereby to radially stress the boss causing it to expand against the interior of the cap and enhance the gripping engagement therewith;

continuing the said rotation of the threaded member until the protruding shoulder thereof engages the second structural member to maintain it in operative engagement with the end wall of the cap to thereby place the threaded member in axial tension.

2. The method of claim 1 further including the step of providing the opening in the cap with a thread means adapted to cooperate with the threaded member.

3. The method of claim 1 further characterized in that the opening in the cap is selected to be smaller than the minor diameter of the threaded member.

4. The method of claim 1 further including the step of providing radially inwardly protruding members on the side wall of the cap to thereby enhance gripping engagement with the boss.

5. The method of claim 4 further characterized in that said inwardly protruding members are serrations.

6. The method of claim 1 further including the step of providing the boss with circumferentially spaced longitudinally extending shoulders.

References Cited

UNITED STATES PATENTS

| 757,226   | 4/1904  | Reininger.            |
|-----------|---------|-----------------------|
| 1,586,439 | 5/1926  | Bennington.           |
| 2,140,014 | 12/1938 | Iasillo _____ 306—30 |
| 2,219,218 | 10/1940 | Berger et al.         |
| 2,271,167 | 1/1942  | Zachry _____ 306—30 |
| 2,452,173 | 10/1948 | Zwiebel.              |
| 2,785,219 | 3/1957  | Rudner.               |

OTHER REFERENCES

"Machine Design," Sept. 29, 1960, p. 103 relied on.

CHARLIE T. MOON, Primary Examiner

U.S. Cl. X.R.

306—30